(12) United States Patent
Ono

(10) Patent No.: US 7,308,324 B2
(45) Date of Patent: Dec. 11, 2007

(54) DATA SIGNAL PROCESSING APPARATUS

(75) Inventor: Hideyuki Ono, Kanagawa (JP)

(73) Assignee: Sony Corporation (JP)

( * ) Notice: Subject to any disclaimer, the term of this patent is extended or adjusted under 35 U.S.C. 154(b) by 719 days.

(21) Appl. No.: 09/957,259

(22) Filed: Sep. 21, 2001

(65) Prior Publication Data

US 2002/0037085 A1    Mar. 28, 2002

(30) Foreign Application Priority Data

Sep. 25, 2000    (JP) .......................... P2000-289849

(51) Int. Cl.
*G06F 17/00* (2006.01)
*H04B 1/00* (2006.01)
*G06F 3/00* (2006.01)

(52) U.S. Cl. ........................................ 700/94; 381/119

(58) Field of Classification Search ................. 700/94; 381/119; 715/716
See application file for complete search history.

(56) References Cited

U.S. PATENT DOCUMENTS 6,047,099 A * 4/2000 Oku ............................ 386/52

OTHER PUBLICATIONS

Roland Corp., Supplemental Notes: DM-800 Multi Track Recorder Tutorial, Jun. 15, 1997, pp. 1-13, http://web.archive.org/web/19970615042858/www.rolandus.com/products/MIFAQS/supnotes/sn_DM-800.html.*
Roland Corp., VS-1680 24-bit Digital Studio Workstation, May 8, 1999, pp. 1-5, http://web.archive.org/web/19990508203938/www.rolandus.com/PRODUCTS/INFO/HTML/VS1680FX.HTM.*
Roland Corp., "24-bit Digital Studio Workstation VS-1680 Owner's Manual", copyright 1998, pp. 12-17, 29, and 44-48.*
Roland Corp., "24-bit Digital Studio Workstation VS-1680 Owner's Manual", copyright 1998, pp. 1-214.*

* cited by examiner

*Primary Examiner*—Sinh Tran
*Assistant Examiner*—Daniel R Sellers
(74) *Attorney, Agent, or Firm*—Lerner, David, Littenberg, Krumholz & Mentlik, LLP

(57) ABSTRACT

An apparatus for processing data signals such as audio signals of plural channels individually. The apparatus has a first number of setting elements to set parameters for processing the data signal of at least one channel; a second number of signal processing elements to process the data signal of at least one channel on the basis of the parameters set by the setting elements; a selection element to select, from the first number of channels, a smaller number of the channels than the second number; and an allocation element for allocating the selected channels correspondingly to any of the second number of the signal processing elements.

3 Claims, 12 Drawing Sheets

| VIRTUAL TRACK | REAL TIME BUTTON | | REAL CHANNEL |
|---|---|---|---|
| TRACK 1 | OFF | | CHANNEL 1 |
| TRACK 2 | ON | | CHANNEL 2 |
| TRACK 3 | ON | • | CHANNEL 3 |
| TRACK 4 | OFF | • | |
| | | • | |
| | | | CHANNEL 23 |
| TRACK 45 | ON | | CHANNEL 24 |
| TRACK 46 | OFF | | |
| TRACK 47 | OFF | | |
| TRACK 48 | ON | | |

DATA SIGNAL PROCESSING APPARATUS

BACKGROUND OF THE INVENTION

The present invention relates to a data signal processing apparatus, and more particularly to an apparatus adapted for use in allocating a plurality of audio signal tracks, which are realized virtually by means of software, to audio signal processing channels less in number than the tracks realized by means of hardware.

There has been known an application program adapted for processing multi-channel audio signals in a multiplicity of stages and then mixing the processed signals, i.e., an application program which enables a personal computer or the like to function as an audio mixer (hereinafter such a program will be referred to as audio mixer application).

Such an audio mixer application is so prepared that a multiplicity of audio tracks termed virtual tracks can be set for achieving a complicated editing work. However, the number of processible audio channels (hereinafter referred to as real channels) is limited in hardware (sound card or the like) for actually changing the frequency characteristics of audio signals or fading the signals under control of the audio mixer application, so that it is necessary to execute a process of allocating virtual tracks correspondingly to real channels.

The known process to attain mutual correspondence between virtual tracks and real channels is classified into a container procedure and a channel selection procedure. Now an explanation will be given on such container procedure and channel selection procedure in an exemplary case where there are 48 virtual tracks and 24 real channels.

First, the container procedure will be explained with reference to FIG. 1. In the container procedure, containers less in number than the real channels are set in combination with a desired number of virtual tracks on an operation image of the audio mixer application. In a reproduction mode, audio signals of containers generated prior to reproduction, i.e., audio signals of the virtual tracks constituting the containers, are rendered (mixed by software), and such signals are supplied to the real channels respectively.

In the example of FIG. 1, audio signals of virtual tracks 1, 2, 3 constituting a container are rendered and supplied to a real channel 1; an audio signal of virtual track 4 is supplied as a container to a real channel 2; and audio signals of virtual tracks 5, 6, 7, 8 constituting a container are rendered and supplied to a real channel 3.

Next, the channel selection procedure will be explained with reference to FIG. 2. In the channel selection procedure, real channels corresponding to the virtual tracks are selected on the operation image of the audio mixer application. In the example of FIG. 2, a real channel 4 corresponds to a virtual track 1, a real channel 1 corresponds to a virtual track 2, and a real channel 2 corresponds to a virtual track 4.

In the container procedure, it is necessary, prior to reproduction, to render the audio signals of the virtual tracks constituting the containers, whereby a problem is raised in the point that satisfactory real-time response fails to be attained with respect to user's manipulation.

Meanwhile in the channel selection procedure, a user needs to set mutual correspondence between virtual tracks and real channels, hence causing a problem that such setting becomes intricate and the operability is impaired.

SUMMARY OF THE INVENTION

The present invention has been accomplished in view of the circumstances mentioned above. And its object resides in realizing automatic setting of mutual correspondence between virtual tracks and real channels.

According to one aspect of the present invention, there is provided a data signal processing apparatus to process data signals of a first number of channels individually. The apparatus comprises a first number of setting means each for setting at least one parameter for processing the data signal of at least one channel; a second number of signal processing means each for processing the data signal of at least one channel on the basis of the parameter set by the setting means; a selection means for selecting, from the first number of channels, a smaller number of the channels than the second number; and an allocation means for allocating the channels, which are selected by the selection means, correspondingly to any of the second number of the signal processing means.

In the above, the data signals may be audio signals.

According to another aspect of the present invention, there is provided a data signal processing method carried out in a data signal processing apparatus which comprises a first number of setting means each for setting at least one parameter for processing data signal of at least one channel, and a second number of signal processing means each for processing the data signal of at least one channel on the basis of the parameter set by the setting means. The method comprises the steps of selecting, from the first number of channels, a smaller number of the channels than the second number; and allocating the channels, which are selected at the selecting step, correspondingly to any of the second number of the signal processing means.

And according to a further aspect of the present invention, there is provided a recording medium where a computer-readable program is recorded for controlling a data signal processing apparatus which comprises a first number of setting means each for setting at least one parameter for processing data signal of at least one channel, and a second number of signal processing means each for processing the data signal of at least one channel on the basis of the parameter set by the setting means. The program comprises the steps of selecting, from the first number of channels, a smaller number of the channels than the second number; and allocating the channels, which are selected at the selecting step, correspondingly to any of the second number of the signal processing means.

In the data signal processing apparatus and method of the present invention and also in the program stored in the recording medium thereof, channels less than the second number are selected from the first number of channels, and the selected channels are allocated correspondingly to any of the second number of signal processing means. And the data signal of at least one channel is processed on the basis of the set parameter, hence achieving automatic setting of the mutual correspondence between virtual tracks and real channels.

The above and other features and advantages of the present invention will become apparent from the following description which will be given with reference to the illustrative accompanying drawings.

DESCRIPTION OF THE PREFERRED EMBODIMENTS

Figure 1:
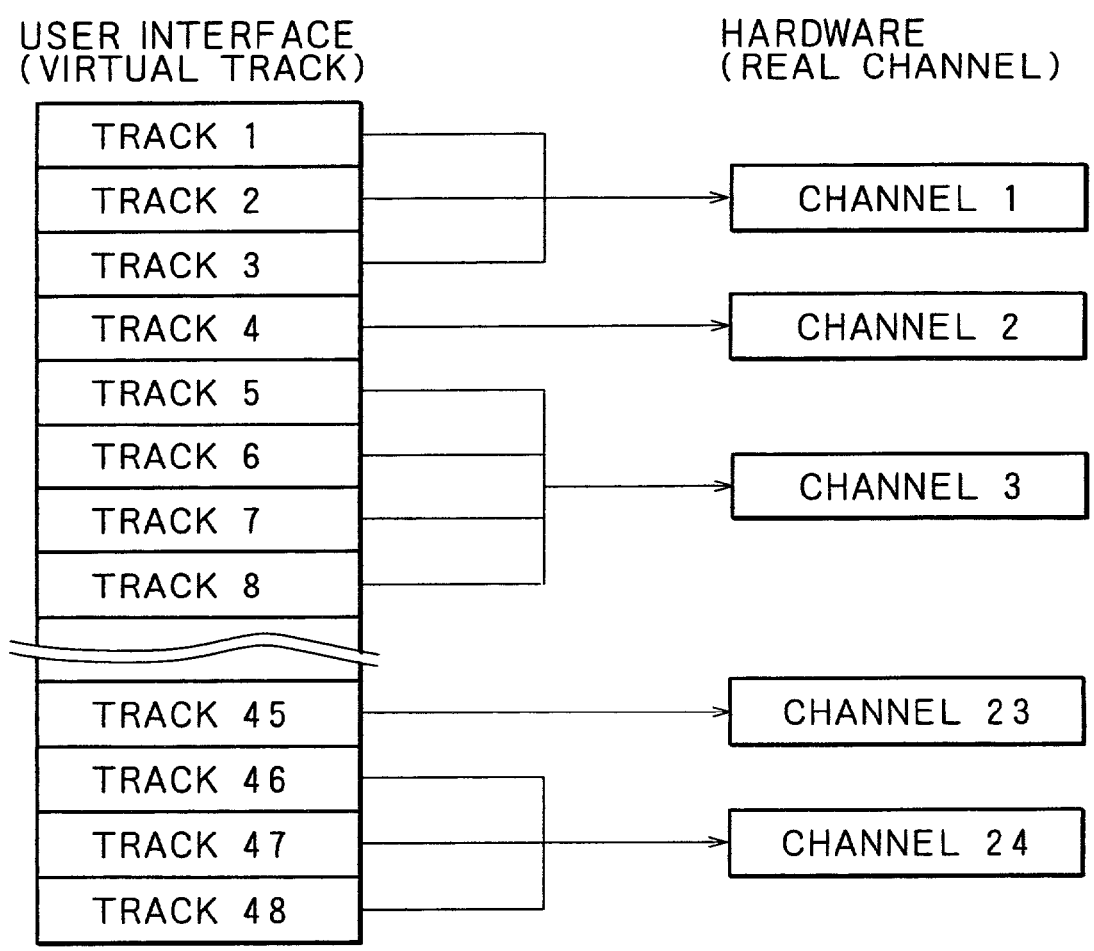
FIG. 1 is a diagram for explaining a conventional container procedure to achieve mutual correspondence between virtual tracks and real channels.
Figure 2:
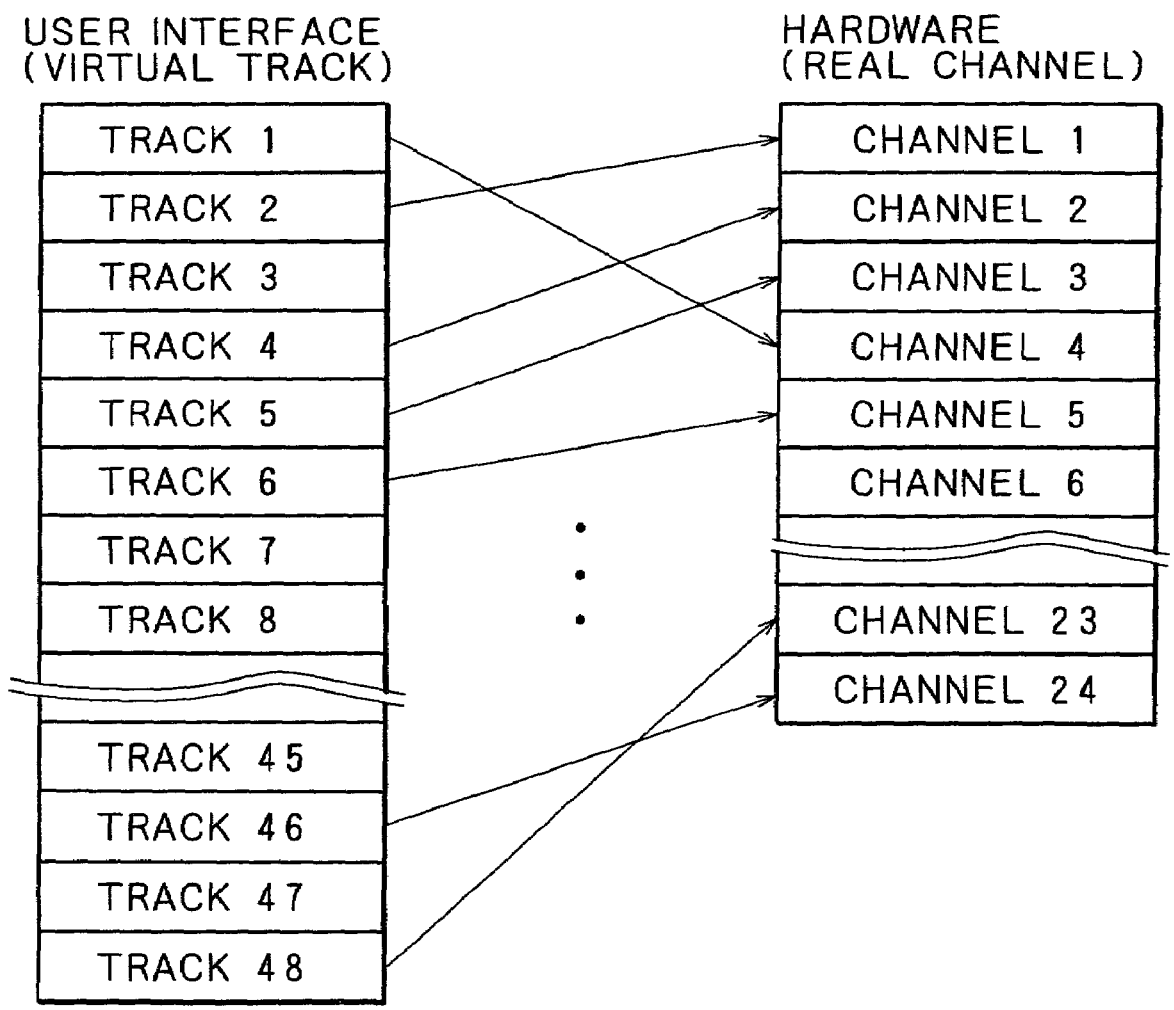
FIG. 2 is a diagram for explaining a conventional channel selection procedure to achieve mutual correspondence between virtual tracks and real channels.
Figure 3:
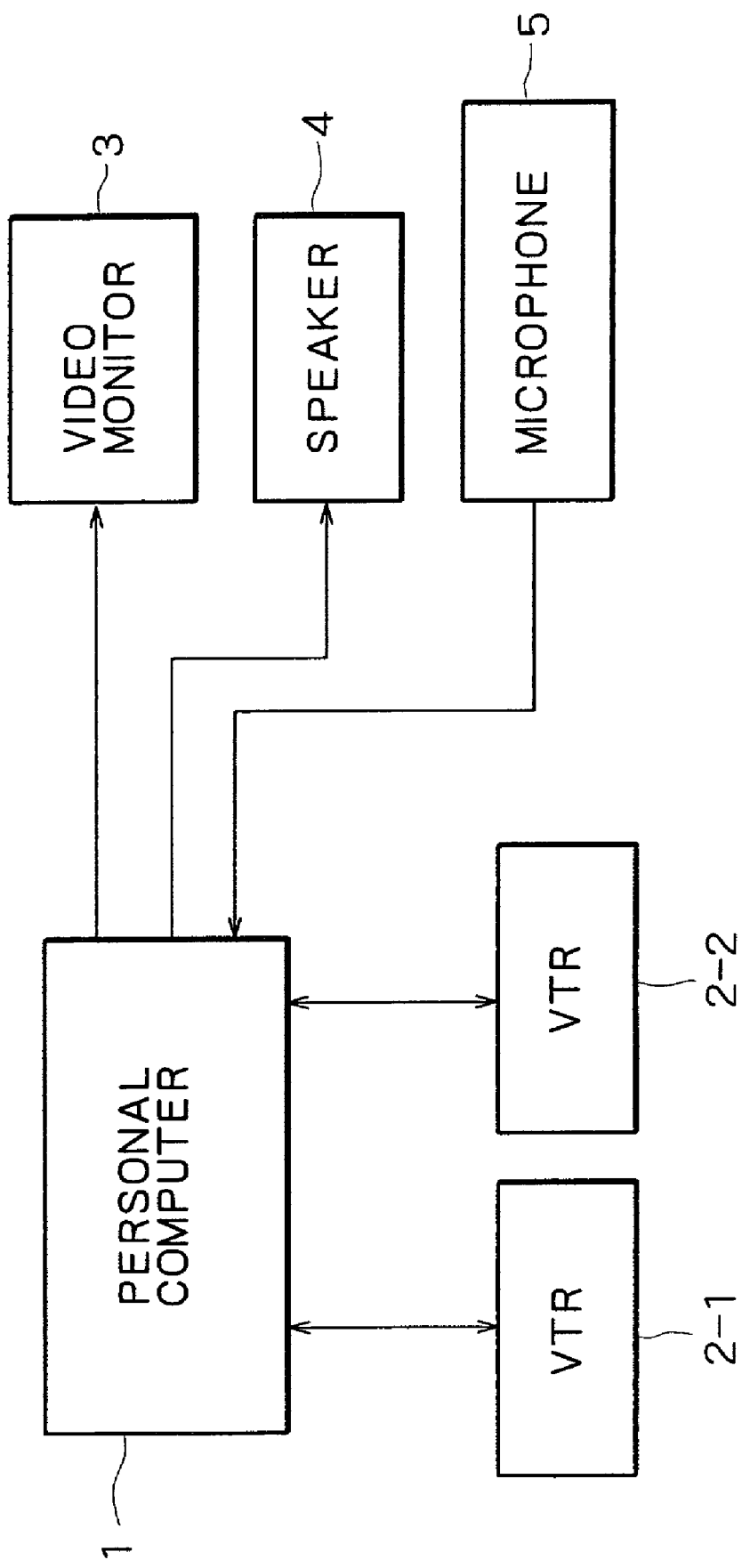
FIG. 3 is a block diagram showing a structural example of a video editing system where the present invention is applied.

Hereinafter a structural example of a video editing system, where the present invention is applied, will be described in detail with reference to FIG. 3. This video editing system comprises a personal computer 1, video tape recorders (VTR) 2-1 and 2-2, a video monitor 3, a speaker 4 and a microphone 5 (with an internal amplifier).

The personal computer 1 functions as a nonlinear video editor through execution of a video editing application program on an operating system such as Windows 2000 (trade name). More specifically, the personal computer 1 as a nonlinear video editor edits AV signals supplied from the video tape recorder (VTR) 2-1 or audio signals supplied from the microphone 5, and then outputs the edited video signals to the video monitor 3 while outputting the edited audio signals to the speaker 4, or outputs the edited result to the VTR 2-2.

The VTR 2-1 or 2-2 may be replaced with a video recording/reproducing device which records AV signals on or reproduces the same from any information recording medium (e.g., DVD (digital versatile disk), hard disk or the like) other than a magnetic tape.

Figure 4:
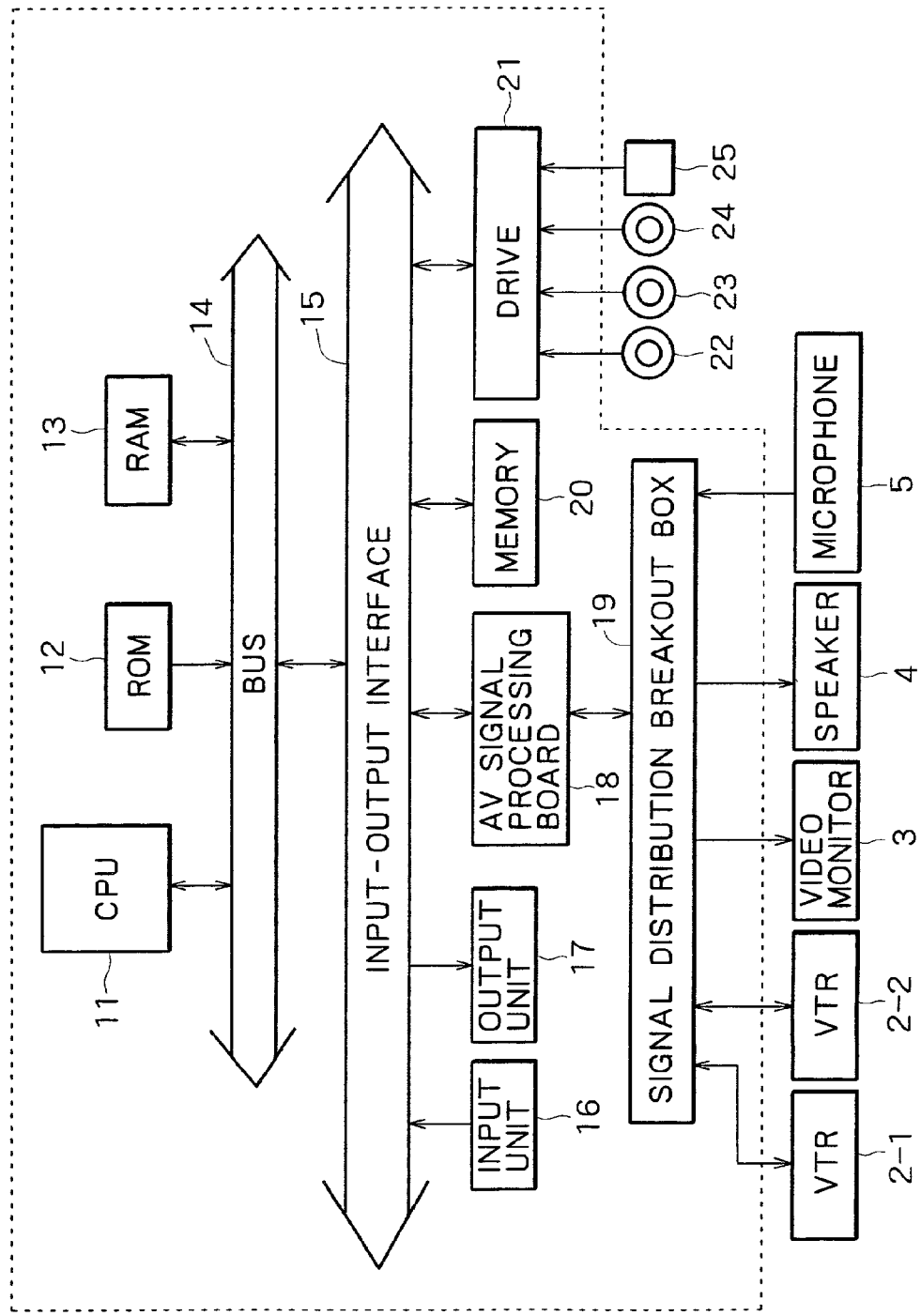
FIG. 4 is a block diagram showing a structural example of a personal computer.

FIG. 4 shows a structural example of the personal computer 1 for executing a video editing application program. The personal computer 1 has an internal CPU (central processing unit) 11. An input-output interface 15 is connected to the CPU 11 via a bus 14. To the input-output interface 15, there are connected an input unit 16 comprising a keyboard, a mouse, and an input device such as a fader controller connected via an unshown USB (universal serial bus) port; a display unit 17 consisting of an LCD (liquid crystal display) or a CRT (cathode ray tube) for displaying each GUI (graphical user interface); an AV signal processing board 18 for processing the AV signals; a memory 20 comprising a hard disk drive and the like to store programs and AV data to be edited; and a drive 21 for writing the data on and/or reading the same from a recording medium such as a magnetic disk 22 (including floppy disk), an optical disk 23 (including CD-ROM (compact disc-read only memory) and DVD (digital versatile disc)), a magneto-optical disk 24 (including MD (mini disc) or a semiconductor memory 25.

To the bus 14, there are connected a ROM (read only memory) 12 where a boot program is stored, and also a RAM (random access memory) 13 used as a working area of the CPU 11.

To the AV signal processing board 18, there is connected a signal distributing breakout box 19 which distributes the AV signals supplied from the AV signal processing board 18 to the VTR 2-2, the video monitor 3 or the speaker 4, or outputs the AV signals supplied from the VTR 2-1 to the AV signal processing board 18.

The video editing application program for enabling the personal computer 1 to execute the operation as a nonlinear video editor is supplied to the personal computer 1 in a state stored in the magnetic disk 22, optical disk 23, magneto-optical disk 24 or semiconductor memory 25, and then is read out by the drive 21 and installed in an internal hard disk drive in the memory 20. The video editing application program thus installed in the memory 20 is loaded from the memory 20 into the RAM 13 according to an instruction sent from the CPU 11 in response to a command input by the user to the input unit 16, and then the application program is executed.

Figure 5:
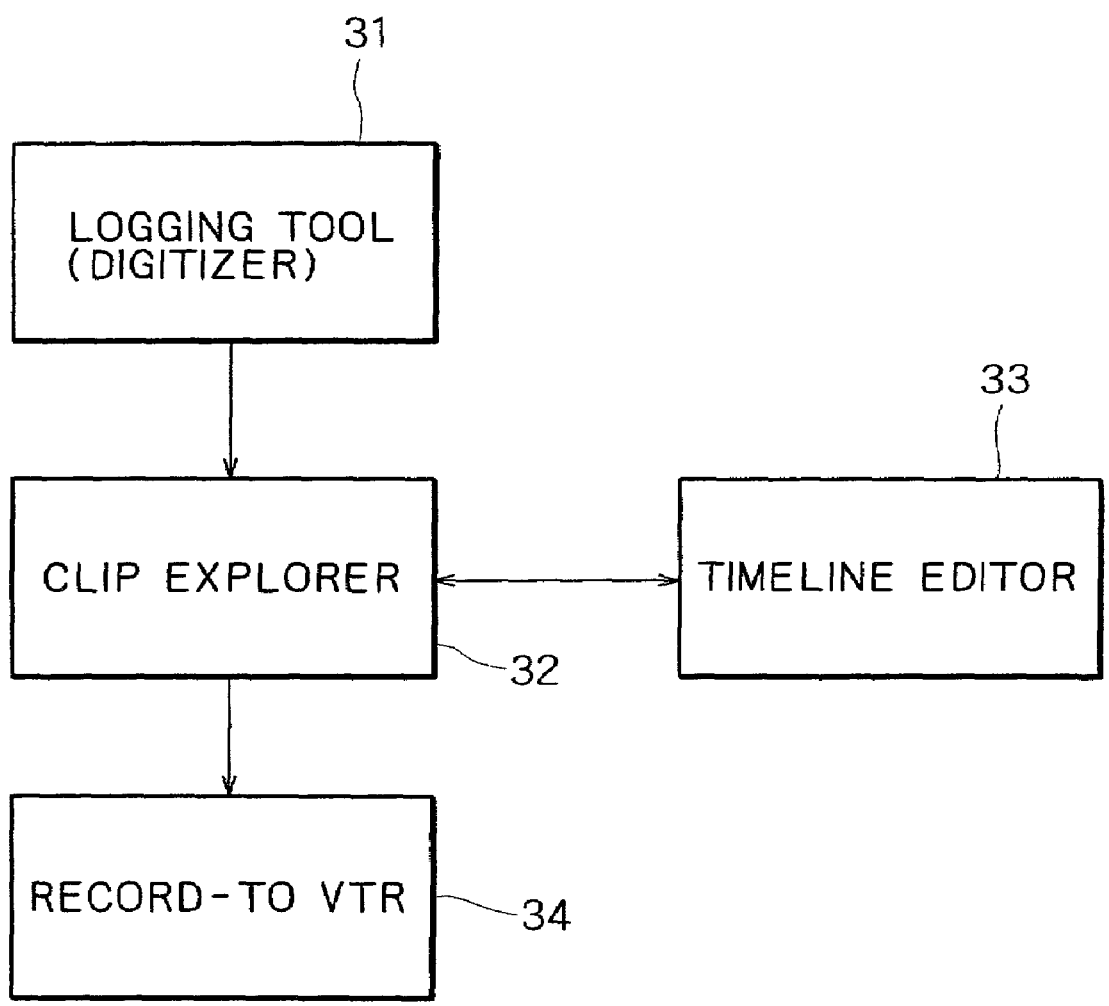
FIG. 5 is a function block diagram of a video editing application program executed in the personal computer.

Referring now to FIG. 5, an explanation will be given on the function of the video editing application program executed by the personal computer 1. FIG. 5 shows function blocks of the video editing application program.

The video editing application program consists principally of a logging tool 31, a clip explorer 32, a timeline editor 33 and a record-to-VTR 34.

The logging tool digitizes the AV signals supplied thereto from the VTR 2, and then stores the digital signals in the memory 20. The clip explorer 32 displays a list of the AV signals stored in the memory 20. The timeline editor 33 edits, clip by clip, the AV signals stored in the memory 20 in response to a manipulation of paste or deletion to the timeline tracks on the GUI.

Figure 6:
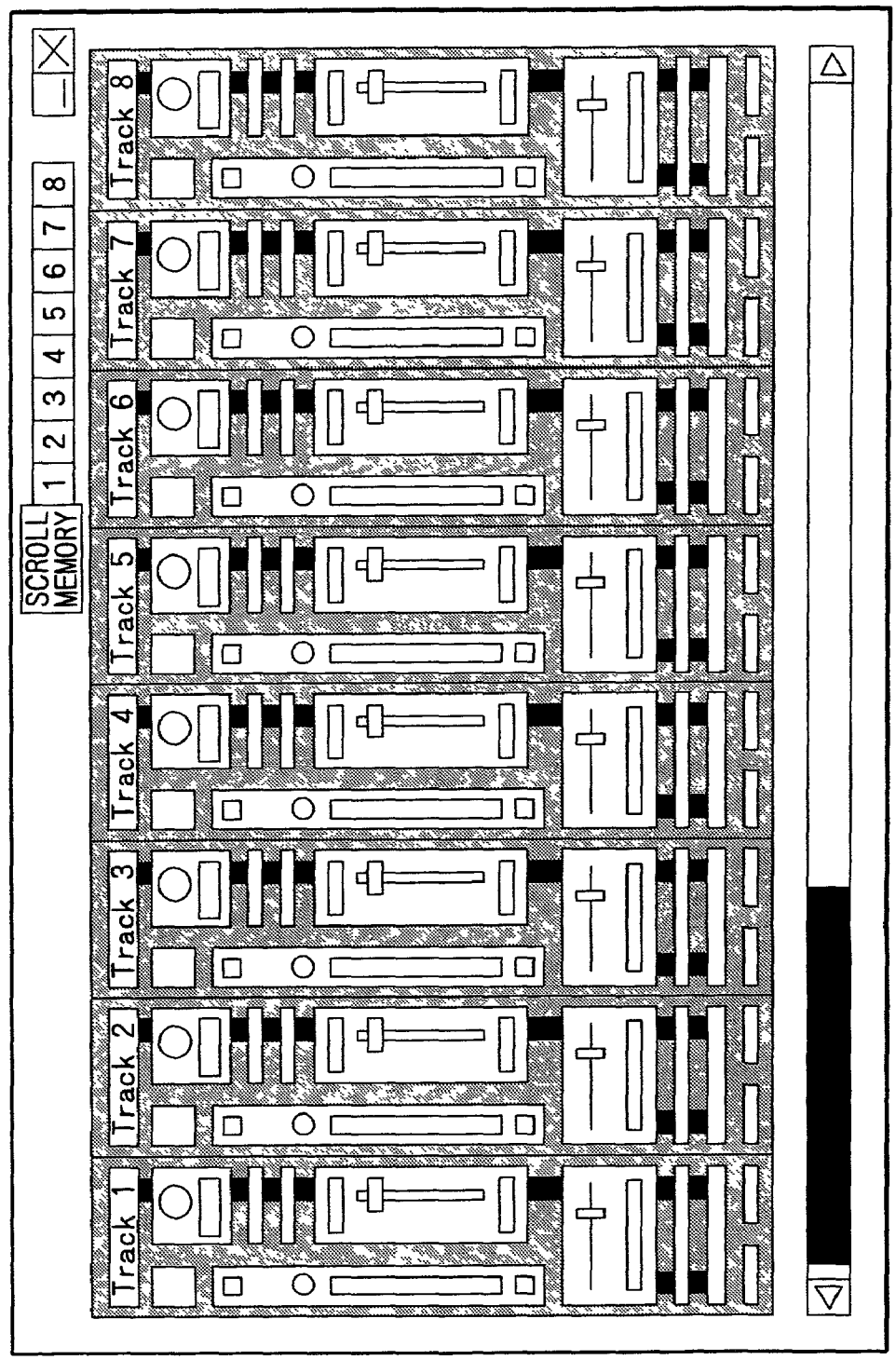
FIG. 6 shows a display example of an audio mixer GUI consisting of a plurality of track modules.

An audio mixer, which processes the audio signals out of the entire AV signals edited by the timeline editor 33, is adapted for setting 48 virtual tracks TRK1 through TRK48. FIG. 6 shows a display example of the GUI used exclusively for the audio mixer (hereinafter referred to as audio mixer GUI). The audio mixer GUI is adapted for simultaneously displaying track modules which correspond to 8 tracks out of the entire virtual tracks TRK1 through TRK48 (as will be described later with reference to FIG. 9).

The record-to-VTR 34 outputs the edited AV signals obtained from the timeline editor 33 to the VTR 2 for recording the signals therein.

Figure 7:
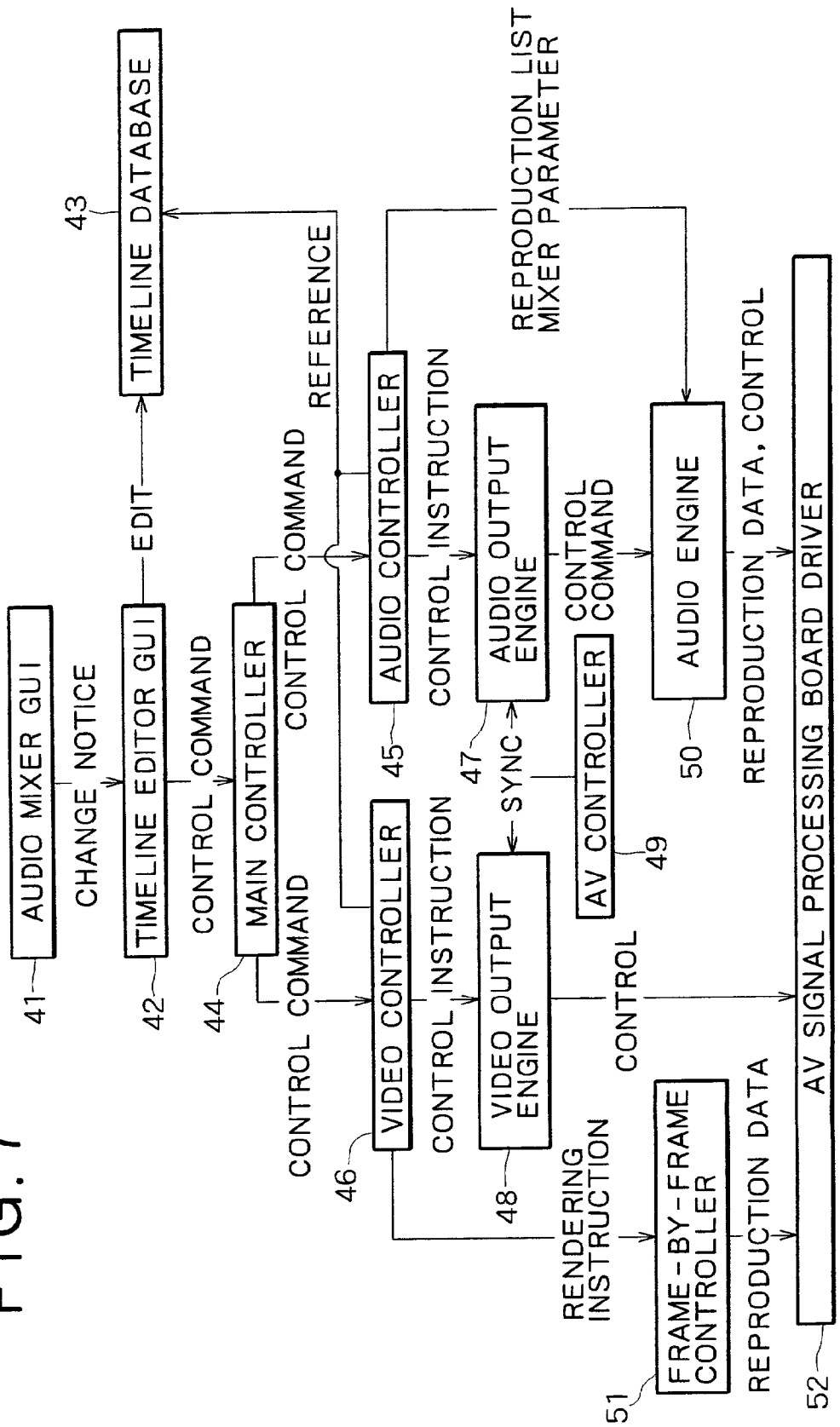
FIG. 7 is a function block diagram of the audio mixer.

Next, an explanation will be given, with reference to a function block diagram of FIG. 7, on the audio signal editing function out of the entire AV signal editing functions of the timeline editor 33.

A timeline editor GUI 41 with the audio editing function edits, in response to the user's manipulation to the timeline editor GUI, a reproduction list recorded in a timeline database 43 (to describe audio files for reproduction and timings thereof). Further the timeline editor GUI 41 outputs a control command to a main controller 44.

An audio mixer GUI 42 changes, in response to the user's manipulation to the audio mixer GUI (FIG. 6), each parameter set in the audio mixer (hereinafter referred to as mixing parameter). The information of the changed mixing parameter is sent to the timeline editor GUI 41 and then is stored correspondingly to the reproduction list recorded in the timeline database 43.

The main controller 44 controls an audio controller 45 and a video controller 46. The audio controller 45 controls an audio output engine 47 and an audio engine 50 which are in the following stage related to the audio signal output. The video controller 46 controls a video output engine 48 and a frame-by-frame controller 51 which are in the following stage related to the video signal output. The AV controller 49 synchronizes the audio output engine 47 and the video output engine 48 with each other.

An AV signal processing board driver 52 controls the AV signal processing board 18 under control of the audio engine 50 and the video output engine 48 in such a manner as to reproduce the data supplied respectively from the audio engine 50 and the frame-by-frame controller 51.

Now the operation of the audio editing function will be explained below. When the user instructs the timeline editor GUI to execute the reproduction list being edited (i.e., reproduction of the audio signals based on the reproduction list), the timeline editor GUI 41 outputs a reproduction control command to the main controller 44. Then, in response to the control command received from the timeline editor GUI 41, the main controller 44 outputs a reproduction control command to the audio controller 45 and the video controller 46.

In response to the reproduction control command from the main controller 44, the audio controller 45 acquires the reproduction list and the corresponding audio mixer parameter from the timeline database 43, and supplies the same to the audio engine 50. Further in response to the reproduction control command from the main controller 44, the audio controller 45 sends a reproduction request to the audio output engine 47. Subsequently, in response to the reproduction request obtained from the audio controller 45, the audio output engine 47 outputs a reproduction control command to the audio engine 50.

The audio engine 50 outputs an audio reproduction control command and the reproduction data to the AV signal processing board driver 52 in response to the reproduction list and the audio mixer parameter obtained from the audio controller 45, and also in response to the control command from the audio output engine 47. The AV signal processing board driver 52 actuates the AV signal processing board 18 on the basis of the control command and the reproduction command obtained from the audio engine 50, thereby starting reproduction of the audio signal.

When the user instructs the timeline editor GUI to stop execution of the reproduction list, the timeline editor GUI 41 outputs a stop control command to the main controller 44. Then, in response to the control command received from the timeline editor GUI 41, the main controller 44 outputs a stop control command to the audio controller 45 and the video controller 46.

In response to the stop control command from the main controller 44, the audio controller 45 sends a stop request to the audio output engine 47. Then the audio output engine 47 sends a stop control command to the audio engine 50 in response to the stop request received from the audio controller 45.

The audio engine 50 outputs an audio stop control command to the AV signal processing board driver 52 in response to the control command from the audio output engine 47. Then the AV signal processing board driver 52 actuates the AV signal processing board 18 to stop reproduction of the audio signal in response to the control command received from the audio engine 50.

Next, an explanation will be given on the AV signal processing board 18. The AV signal processing board 18 is equipped with a DSP (digital signal processor) to process the audio signals exclusively, and operates as an audio mixer to mix audio signals of plural (48 in this case) virtual tracks stored in the memory 20. It is supposed in this embodiment that the number of tracks processible simultaneously by the AV signal processing board 18, i.e., the number of real channels, is set to 24. However, the number of virtual tracks and that of real channels are not limited to the above numerical values alone, and may be changed adequately in accordance with the processing capability of the apparatus.

Figure 8:
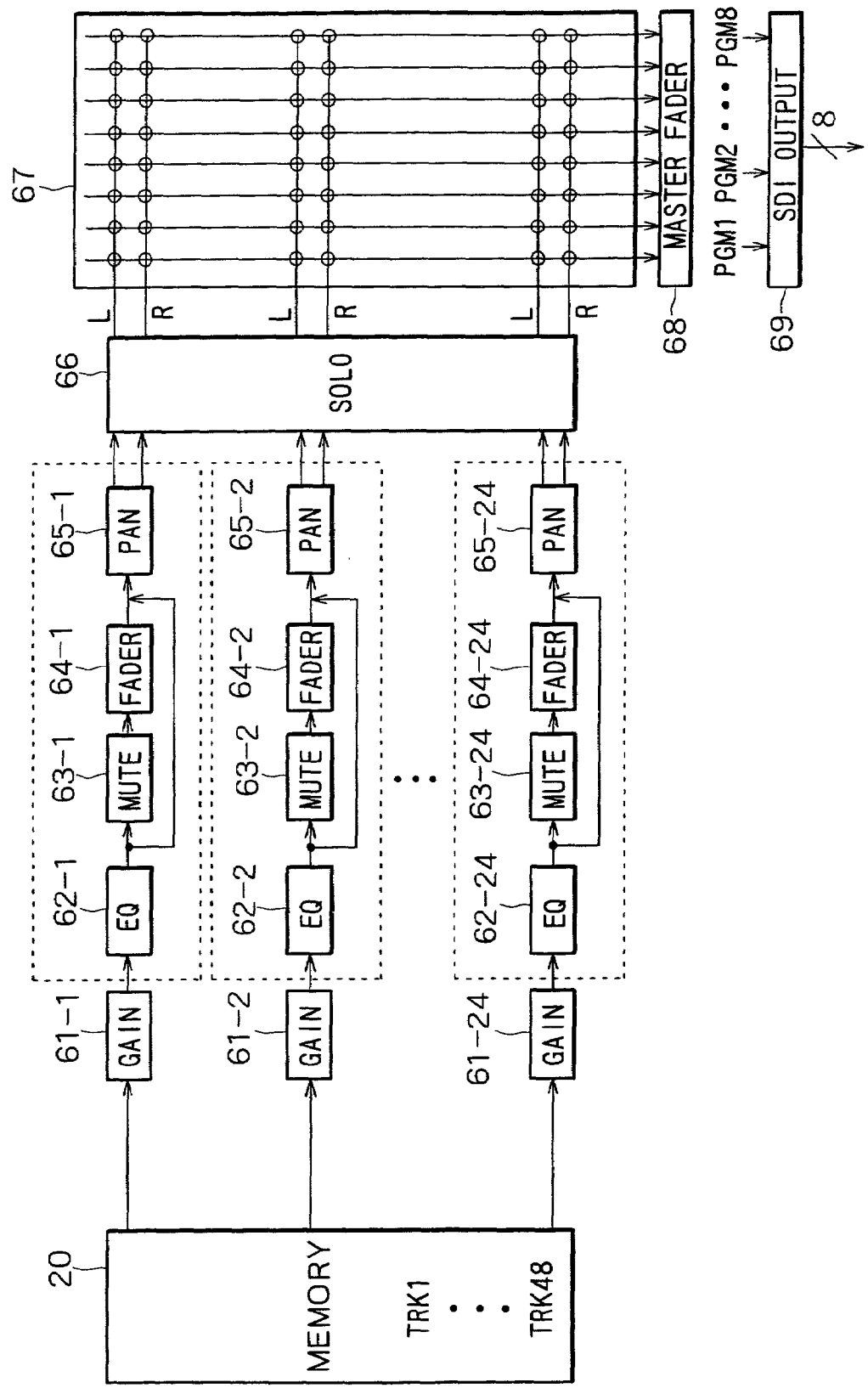
FIG. 8 is a function block diagram of an AV signal processing board.

FIG. 8 is a function block diagram of the AV signal processing board 18 having 24 real channels in conformity with the user's manipulation to the audio mixer GUI shown in FIG. 6. Audio signals of 24 tracks (out of the entire virtual tracks TRK1 through TRK48) set through the audio mixer GUI by the user are inputted to real channels CH1 through CH24 of the AV signal processing board 18. (A detailed description thereof will be given later with reference to FIGS. 10 through 12).

Regarding each of the real channels CH1 through CH24 of the AV signal processing board 18, there are provided a gain (GAIN) 61-N (where N=1, 2, . . . , 24) for amplifying the audio signal, an equalizer (EQ) 62-N for setting the signal level of each frequency band of the audio signal in accordance with the user's instruction, a mute (MUTE) 63-N for muting the audio signal, a fader (FADER) 64-N for fading the audio signal, and a pan (PAN) 65-N for distributing the audio signal to left and right (LR).

The outputs of the pans 65-1 through 65-24 are delivered to a group bus 67. In case more than one solo track are outputted, only the audio signal of the relevant track is delivered to the group bus 67.

The group bus 67 combines, in accordance with the user's instruction, the left and right audio signals of 24 tracks inputted from a solo 66, and then delivers the resultant program signals (combined audio signals) PGM1 through PGM8 to a master fader 68. The master fader 68 amplifies the program signals inputted from the group bus 67, and then delivers the amplified signals to an SDI (serial digital interface) output 69. Thereafter the SDI output 69 converts the program signals PGM1 through PGM8 from the master fader 68 into an SDI format, and outputs the converted signals to the signal distribution breakout box 19.

Figure 9:
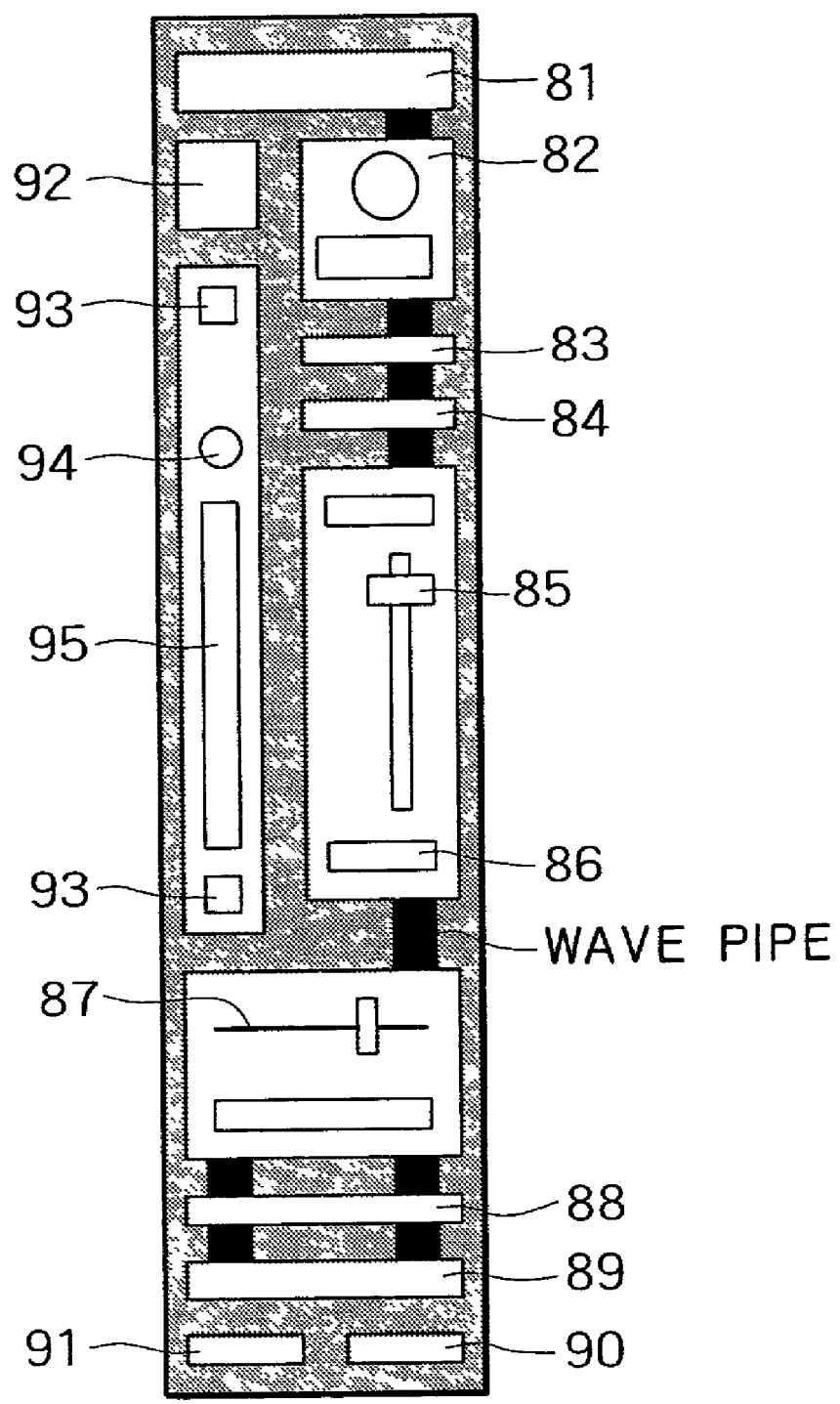
FIG. 9 is a diagram showing details of a track module.

FIG. 9 shows a display example of 48 track modules provided on the audio mixer GUI correspondingly to the virtual tracks TRK1 through TRK48. As obvious from comparison with the structural example of the AV signal processing board 18 shown in FIG. 8, each track module has buttons, a slider and the like disposed from the top of each module toward the bottom thereof in the same order as the processing order of the gain 61-N to the solo 66 which process the audio signals in the AV signal processing board 18.

A track name edit button 81 on each track module is clicked when displaying a GUI to set a track name. The track name edit button 81 displays the name of the set track. A clip gain 82 is manipulated when setting a gain in the gain 61-N of the corresponding real channel. An equalizer button 83 is clicked when displaying an equalizer GUI to set a frequency band characteristic in the equalizer 62-N. And a mute button 84 is clicked when switching on or off the muting of the mute 63-N.

A track level fader 85 is slid when instructing the fader 64-N to fade the track level. A fader group button 86 is manipulated when setting a combination of tracks in connection with fading over plural tracks. A pan slider 87 is manipulated when setting distribution of the audio signals to left and right for pan 65-N. A solo button 88 is clicked when enabling the solo 66 to pass only the audio signal of the relevant track for monitoring. A router button 89 is clicked when displaying the GUI to select a track for generation of a program signal in the group bus 67.

An automation read button 90 is clicked when reproducing the recorded manipulation executed to the relevant track module. And an automation write button 91 is clicked when recording the manipulation executed to the relevant track module.

A real time button 92 is clicked when allocating the virtual track, which corresponds to the relevant track module, to the real channel of the AV signal processing board 18, or when canceling the allocation. That is, every time the real time button 92 is clicked, it is alternately switched to an on-state for allocating the virtual track to the real channel or to an off-state for canceling the allocation. Out of the entire track modules corresponding to the total number of virtual tracks (48 in this case), the number of track modules permitted to turn on the real time buttons 92 simultaneously is limited to the number of the real channels (24 in this case).

One of two meter select buttons 93, 93 is clicked when designating a desired point on the circuit to display the signal level in a meter 95. An overflow indicator 94 is turned on when the level of the audio signal passing through the point designated by the meter select buttons 93, 93 is higher than a threshold value. The meter 95 visually displays the level of the audio signal passing through the point designated by the meter select button 93.

A wave pipe is displayed between buttons or the like of each track module correspondingly to the path between the gain 61-N and the solo 66 to process the audio signal in the AV signal processing board 18.

For example, a wave pipe displayed between the equalizer button 83 and the mute button 84 on each track module corresponds to the path between the equalizer 62-N and the mute 63-N of the relevant real channel. Also, a wave pipe displayed between the track level fader 85 and the pan slider 87 corresponds to the path between the fader 64-N and the pan 65-N of the AV signal processing board 18.

The display color of the wave pipe is changed in two cases, i.e., in one state where the corresponding path on the AV signal processing board 18 permits the audio signal to pass therethrough in accordance with setting of the mute button 84, the track level fader 85, the pan slider 87 and the solo button 89 of each track module, or in another state where the corresponding path on the AV signal processing board 18 does not permit the audio signal to pass therethrough.

Figure 10:
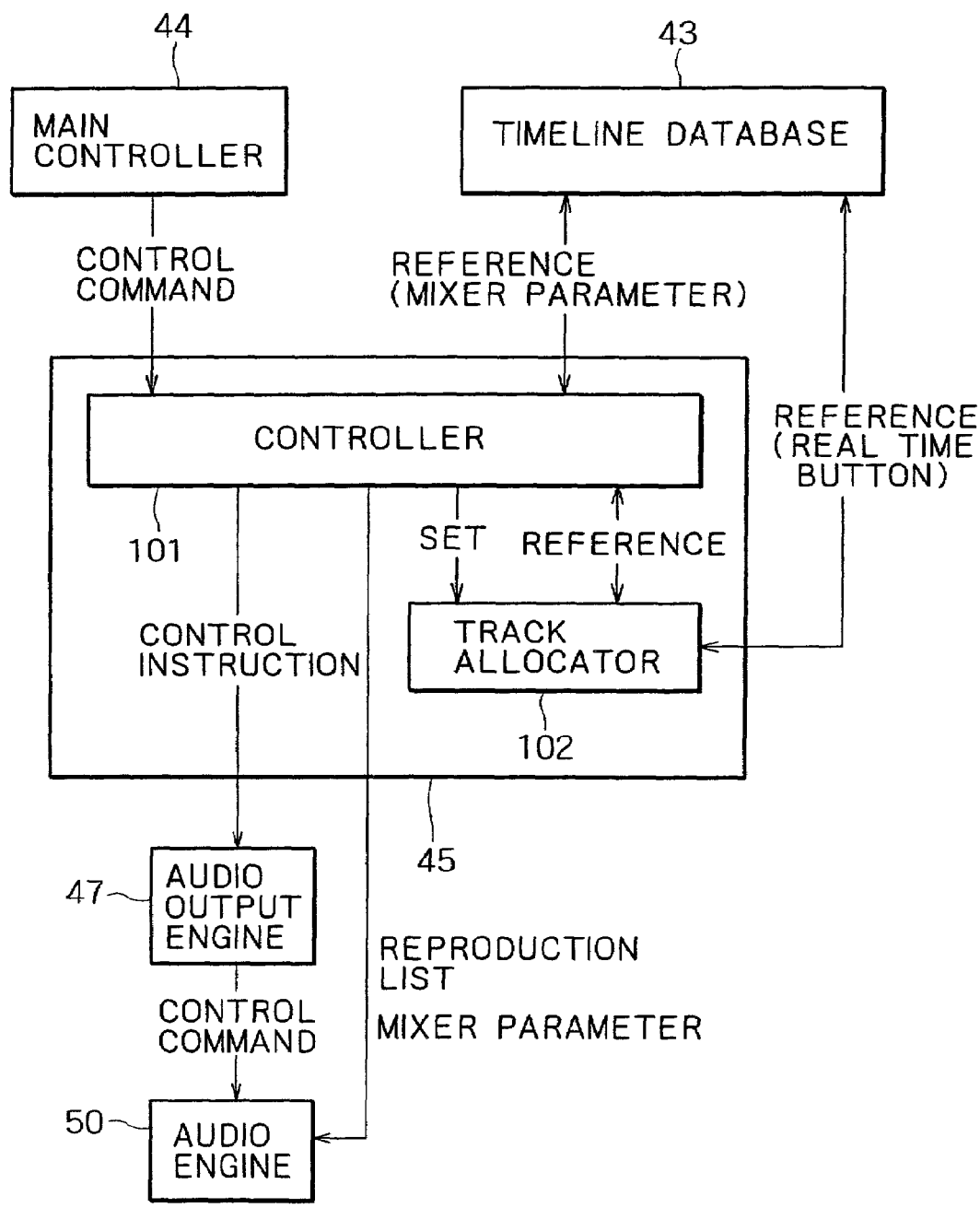
FIG. 10 is a block diagram showing a structure of an audio controller.
Figure 11:
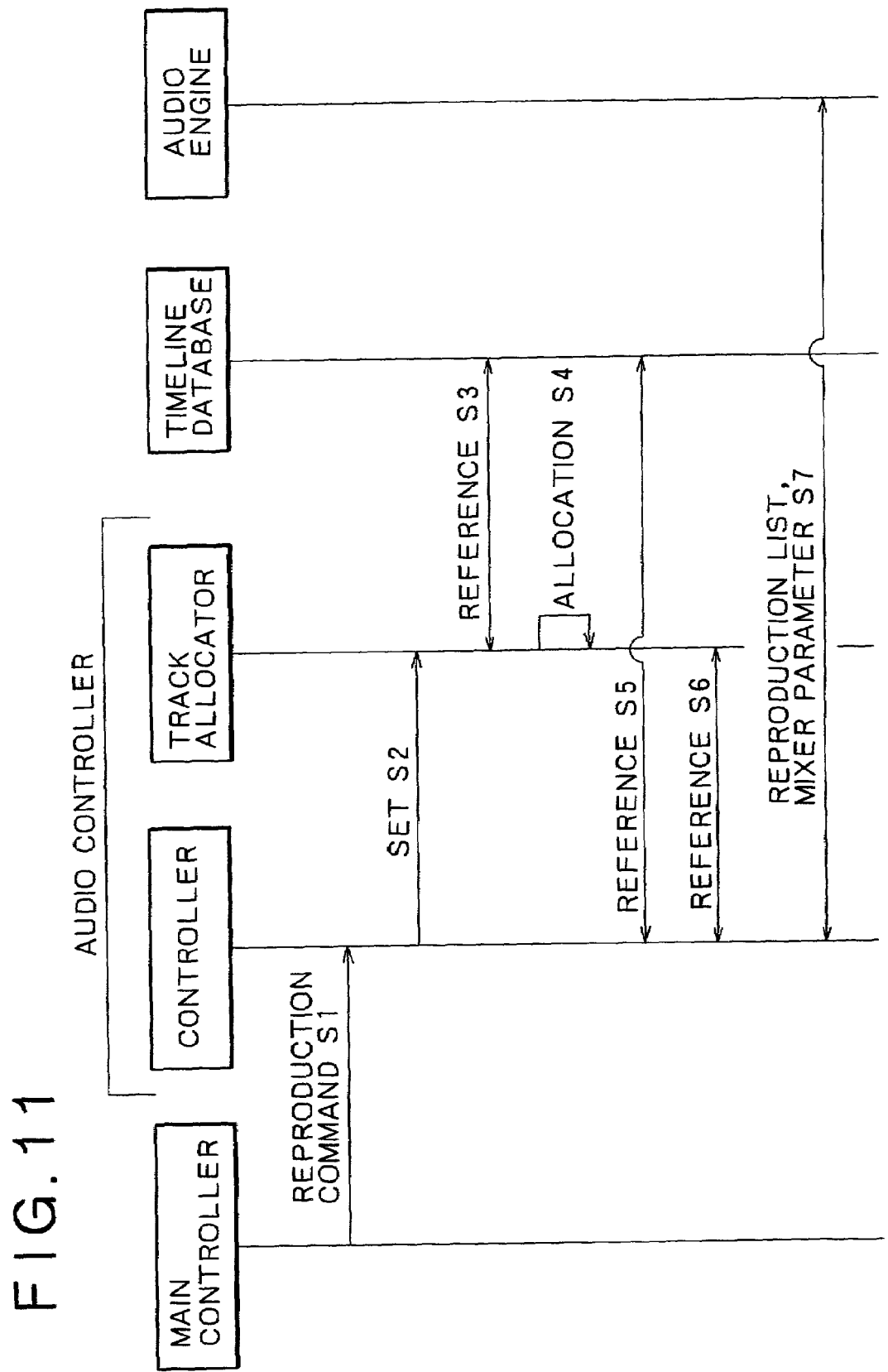
FIG. 11 is a timing chart for explaining a real channel allocation sequence in a reproduction mode.
Figure 12:
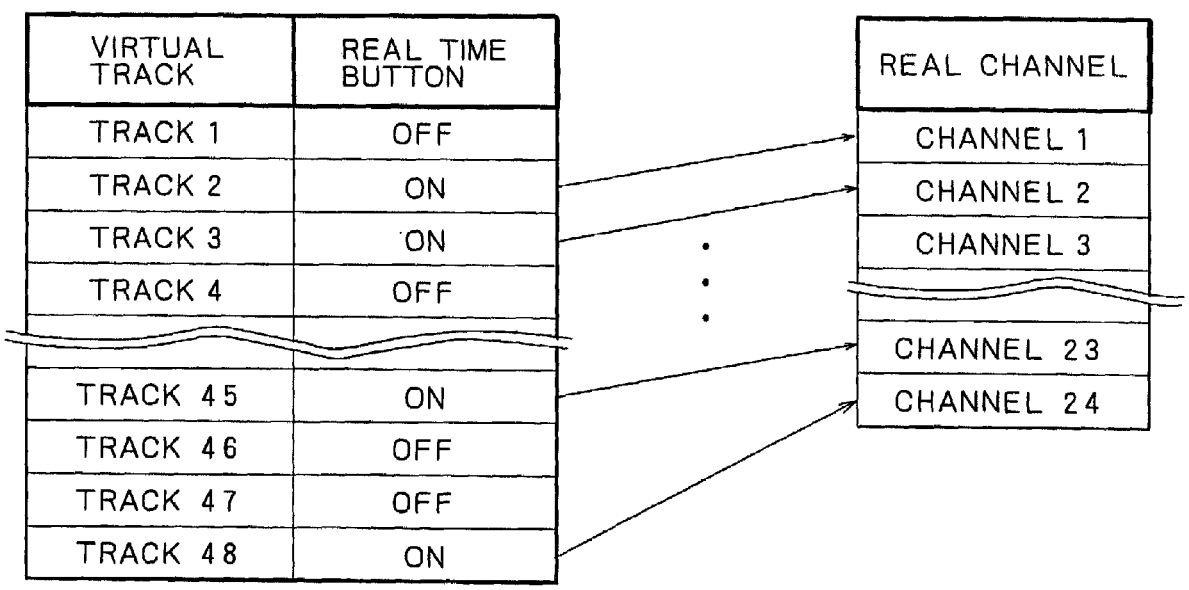
FIG. 12 is a diagram for explaining allocation of real channels.

Referring now to FIGS. 10 through 12, an explanation will be given on a process of allocating virtual tracks TRK1 through TRK48 to real channels CH1 through CH24 of the AV signal processing board 18 (hereinafter this process will be referred to simply as real channel allocation).

The audio mixer GUI 41 keeps monitoring the user's manipulation to each track module, and in case the real time button 92 of any track module is clicked to be changed in state (e.g., from an off-state to an on-state), the audio mixer GUI 41 notifies the timeline editor GUI 42 of such a change. Then the timeline editor GUI 42 edits the timeline database 43 in response to such a notice of the change, whereby the setting change of the real time button 92 is recorded as the track information in the timeline database 43.

As described, out of the entire track modules corresponding to the total number of virtual tracks (48 in this case), the number of track modules permitted to turn on the real time buttons 92 simultaneously is limited to the number of the real channels (24 in this case) under control of the timeline database 43.

A track allocator 102 (FIG. 10) in the audio controller 45 executes allocation of real channels with reference to the information (such as the state of the real time button 92 in each track module) recorded in the timeline database 43.

The real channel allocation executed by the track allocator 102 is classified into a playback mode, a voice over mode and a digital scrub mode.

In the playback mode, any real channel set for play is allocated to the virtual track where the real time button 92 is in on-state. Meanwhile in the voice over mode, any real channel set for play is allocated to the virtual track where the real time button 92 is in on-state, and further any real channel set for recording is allocated to the virtual track selected for voice over, so that two real channels for play and recording are allocated to the virtual track selected for voice over. Therefore, in the voice over mode, the number of track modules permitted to turn on the real time buttons 92 is reduced in comparison with the number in the playback mode (24 in this case).

In the digital scrub mode, when there exist solo-designated virtual tracks until the second one counted from the top on the timeline editor, the real channel set for play is allocated to such virtual tracks. Meanwhile, when there exists none of solo-designated virtual track, the real channel set for play is allocated to the virtual tracks where the real time buttons 92 until the second one counted from the top on the timeline editor are in on-state.

In the above description, any real channel set for play is defined as a real channel whose input source is an audio file stored in the memory 20. And any real channel set for recording is a real channel whose input source is an audio signal obtained from the microphone 5 or the VTR 2-1.

"Voice over" signifies an operation of specifying a desired period of the audio track being reproduced and then recording the audio signal inputted from the microphone 5 during such a period.

Next, with reference to a timing chart of FIG. 11, an explanation will be given on the sequence of the real channel allocation executed in reproduction. This sequence is started in response to an instruction for reproduction transmitted by the user to the timeline editor GUI.

At step S1, the timeline editor GUI 42 notifies the audio controller 101 of a reproduction command via the main controller 44. In response to this command, the controller 101 urges the track allocator 102, at step S2, to set each real channel corresponding to the mode. Then the track allocator 102 sets each real channel for play or recording in accordance with the mode specified previously.

Subsequently at step S3, the track allocator 102 refers to the track information stored in the timeline database 43, and then executes real channel allocation at step S4. More concretely, as shown in FIG. 12, the state (on or off) of the real time button 92 in each track module corresponding to the relevant virtual track is confirmed, then the virtual track corresponding to the on-state track module is allocated to the vacant real channel, and the mutual correspondence between the virtual track and the real channel is stored.

Returning to FIG. 11 again, the controller 101 refers to the timeline database 43 at step S5 and reads out the reproduction data (reproduction list and mixer parameters) stored therein. Subsequently at step S6, the controller 101 refers to the information of mutual correspondence between the virtual tracks and the real channels stored in the track allocator 102. And at step S7, the controller 101 adds the information of mutual correspondence between the virtual tracks and the real channels to the reproduction list thus read out, and then outputs the same to the audio engine 50.

In this embodiment, as described above, any virtual track can be allocated correspondingly to a vacant real channel or can be released therefrom merely by clicking the real time button 92 of each track module. The number of track modules permitted to simultaneously turn on the real time buttons 92 is limited automatically. Therefore, it becomes possible to enhance the operability in allocating virtual tracks correspondingly to real channels.

The embodiment mentioned is so contrived as to allocate any virtual track correspondingly to a vacant real channel or to cancel such allocation by every click of the real time button 92 of each track module. However, a similar function may be furnished to some other button (e.g., mute button 84) provided on each track module, or to some button provided on the timeline editor GUI.

It is to be understood that the present invention is not limited to an audio signal processing apparatus alone, and may also be applied to another case of allocating virtual resources, which are realized by means of software, correspondingly to finite physical resources constituted of hardware.

In this specification, the steps that describe the program recorded in the recording medium connote, in addition to the processes executed time-sequentially in accordance with the predetermined order, also the processes executed either parallelly or individually.

What is claimed is:

1. A data signal processing apparatus for individually processing audio signals of a plurality of virtual channels, comprising:

a plurality of graphical setting means equal in number to the plurality of virtual channels for setting at least a real-time button to enable allocation and a solo button for each of the plurality of virtual channels;

a plurality of real signal processing means less in number than the plurality of virtual channels for processing the audio signals of the plurality of virtual channels based upon the settings of the plurality of setting means;

selection means for selecting from the plurality of virtual channels a set of channels, the set having a number of channels less than or equal to the number of the plurality of real signal processing means; and allocation means for automatically allocating the virtual channels of the set of channels to any of the plurality of real signal processing means based on the settings of the corresponding real-time button, thereby automatically setting a mutual correspondence between the set of channels and the plurality of real signal processing means;

wherein each virtual channel in the set of channels is allocated in one of a playback mode, a voiceover mode, and a digital scrub mode; the digital scrub mode being set when the solo button is set.

2. A data signal processing method performed in a data signal processing apparatus that has a plurality of graphical virtual setting means for setting at least a real-time button to enable allocation and a solo button for each of a plurality of virtual channels equal in number to the plurality of graphical virtual setting means; and a plurality of real signal processing means less in number than the plurality of virtual channels for processing audio signals of the plurality of virtual channels based upon the settings of the plurality of setting means, comprising the steps of:

selecting from the plurality of virtual channels a set of channels, the set having a number of channels less than or equal to the number of the plurality of real signal processing means; and automatically allocating the virtual channels of the set of channels to any of the plurality of real signal processing means based on the settings of the corresponding real-time button, thereby automatically setting a mutual correspondence between the set of channels and the plurality of real signal processing means;

wherein each virtual channel in the set of channels is allocated in one of a playback mode, a voiceover mode, and a digital scrub mode; the digital scrub mode being set when the solo button is set.

3. A recording medium upon which a computer-readable program is recorded for controlling a data signal processing apparatus that has a plurality of graphical virtual setting means for setting at least a real-time button to enable allocation and a solo button for each of a plurality of graphical virtual channels equal in number to the plurality of virtual setting means; and a plurality of real signal processing means less in number than the plurality of virtual channels for processing audio signals of the plurality of virtual channels based upon the settings of the graphical virtual setting means, the program comprising the steps of:

selecting from the plurality of virtual channels a set of channels, the set having a number of channels less than or equal to the number of the plurality of real signal processing means; and automatically allocating the virtual channels of the set of channels to any of the plurality of signal processing means based on the settings of the corresponding real-time button, thereby automatically setting a mutual correspondence between the set of channels and the plurality of real signal processing means;

wherein each virtual channel in the set of channels is allocated in one of a playback mode, a voiceover mode, and a digital scrub mode; the digital scrub mode being set when the solo button is set.

* * * * *